United States Patent

Siegenthaler

[11] Patent Number: 5,208,045
[45] Date of Patent: May 4, 1993

[54] TIRE CURING UNIT

[75] Inventor: Karl J. Siegenthaler, Rome, Italy

[73] Assignee: Bridgestone Corporation, Tokyo, Japan

[21] Appl. No.: 810,249

[22] Filed: Dec. 19, 1991

[30] Foreign Application Priority Data

Apr. 12, 1991 [IT] Italy .............. TO91A-000278

[51] Int. Cl.⁵ ................................ B29C 35/00
[52] U.S. Cl. .................................. 425/35; 425/36;
425/47; 425/48; 425/56; 425/57
[58] Field of Search ................ 425/28.1, 35, 36, 47,
425/48, 49, 51, 56, 57

[56] References Cited

U.S. PATENT DOCUMENTS

| | | |
|---|---|---|
| 814,476 | 3/1906 | Reed . |
| 1,872,158 | 8/1932 | Maynard . |
| 2,297,017 | 9/1942 | Overman . |
| 2,375,784 | 5/1945 | Glynn . |
| 2,557,014 | 6/1951 | Sklarsky . |
| 2,812,547 | 11/1957 | Duerksen et al. . |
| 3,025,562 | 3/1962 | Nelson . |
| 3,370,322 | 2/1968 | Nowicki . |
| 3,484,898 | 12/1969 | Cantarutti et al. . |
| 4,022,554 | 5/1977 | MacMillan ............. 425/36 X |
| 4,533,304 | 8/1985 | Amano et al. . |
| 4,630,114 | 12/1986 | Drewel et al. . |
| 4,647,273 | 3/1987 | Singh et al. . |
| 4,718,845 | 1/1988 | Sheffield et al. . |
| 4,741,682 | 5/1988 | Mauro . |
| 4,744,739 | 5/1988 | Singh . |
| 4,834,636 | 5/1989 | Ichikawa et al. . |
| 4,871,305 | 10/1989 | Galigani . |
| 5,011,392 | 4/1991 | Katayama et al. ............. 425/35 |
| 5,127,811 | 7/1992 | Trethowan ............. 425/36 X |

Primary Examiner—Charles Hart
Attorney, Agent, or Firm—David A. Thomas

[57] ABSTRACT

A curing unit (1) (40) wherein a mold (2) is defined by first and second releasable half molds (3,4) moving in relation to each other along a first axis (6); the first half mold (3) being designed to turn about a second axis (30) perpendicular to the first axis (6) by virtue of actuators (31) which, when the half molds (3,4) are released, can turn the first half mold (3) to and from a maintenance position wherein its concave side faces upwardly.

12 Claims, 3 Drawing Sheets

5,208,045

TIRE CURING UNIT

TECHNICAL FIELD

The present invention relates to a tire curing unit. In particular, the present invention relates to a curing unit comprising a curing mold, in turn comprising two oppositely-concave half molds coaxial to each other and to a first axis; a number of mold segments connected in a sliding manner to a first one of said half molds; means for releasably connecting the half molds; and actuating means for moving the half molds in relation to each other along said first axis and between closed and open positions.

BACKGROUND OF THE ART

On known curing units of the aforementioned type, for removing and replacing the mold segments with others of a different design and/or size, the half molds are opened for enabling access to the segments by one or more operators.

In view of the limited space available between the half molds, the above procedure is a painstaking, time-consuming job usually requiring the assistance of more than one operator.

DISCLOSURE OF THE INVENTION

It is an object of the present invention to provide a curing unit designed to overcome the aforementioned drawback.

According to the present invention, there is provided a tire curing unit comprising a mold, in turn comprising two oppositely-concave half molds coaxial with each other and with a first axis; a number of mold segments connected in a sliding manner to a first one of said half molds; means for releasably connecting said half molds; and first actuating means for moving said half molds in relation to each other along said first axis and between closed and open positions; characterized by the fact that second actuating means are provided for rotating at least said first half mold about a second axis and to and from a maintenance position wherein the concave side of said first half mold faces substantially upwardly.

BRIEF DESCRIPTION OF THE DRAWINGS

A number of non-limiting embodiments of the present invention will be described by way of example with reference to the accompanying drawings, in which.

DESCRIPTION OF THE PREFERRED EMBODIMENT

Figure 1:
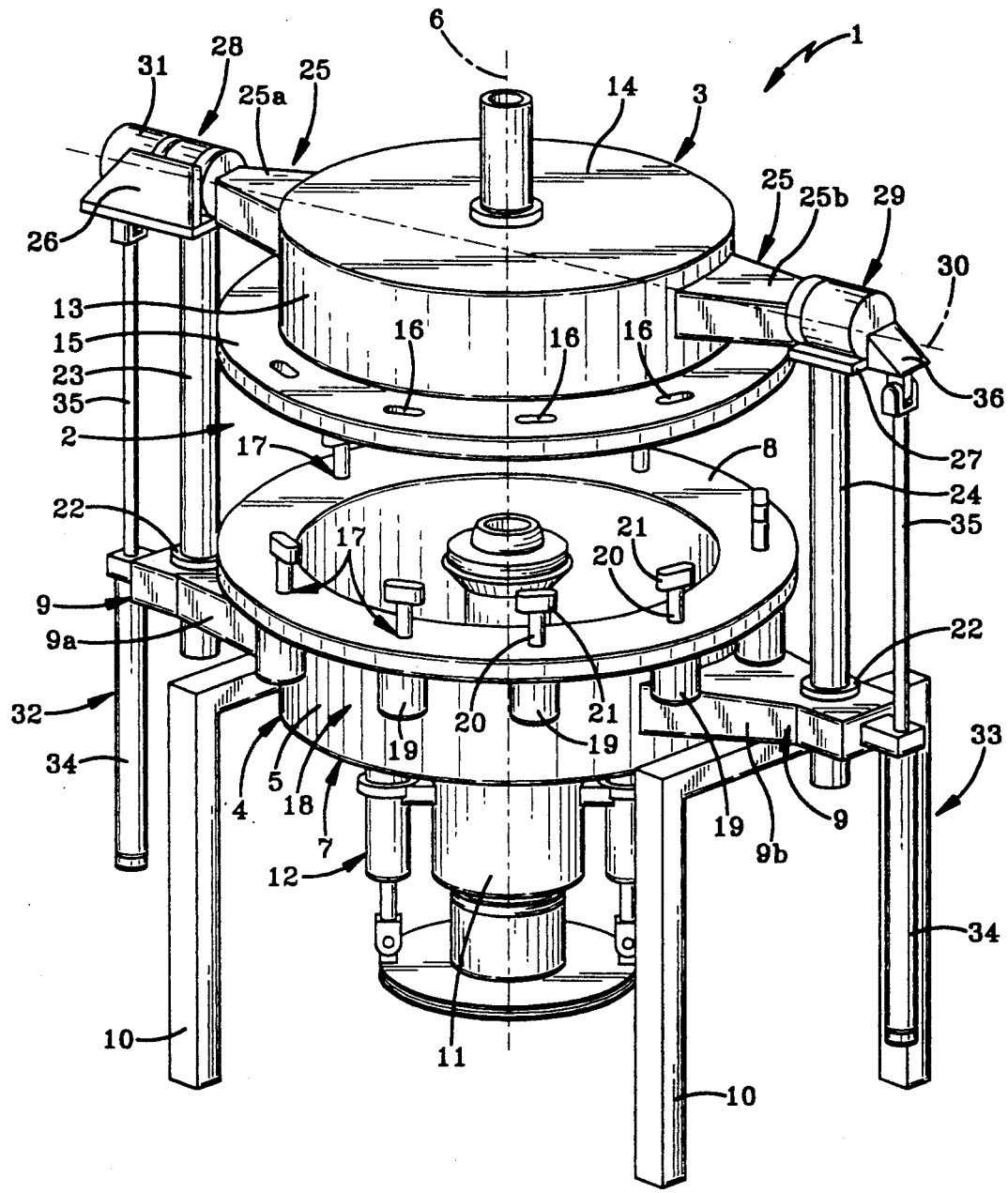
FIG. 1 shows a view, in perspective, of a first embodiment of the curing unit according to the present invention.

Number 1 in FIG. 1 indicates a tire curing unit comprising mold 2 defined by releasable, substantially cup-shaped upper and lower half molds 3 and 4 respectively, arranged, when operative, with their concave sides facing each other.

Lower half mold 4 comprises a cylindrical wall 5 having a vertical axis 6 and is closed at the bottom by end wall 7. Cylindrical wall 5 includes a flange 8 extending radially outwardly from the top edge of wall 5; and two diametrically-opposed radial appendices 9, indicated respectively 9a and 9b, integral with and extending outwardly from the outer peripheral surface of wall 5. Each appendix 9 rests on a respective stand 10 which, together with the other stand 10, supports mold 2 and provides for maintaining lower half mold 4 a given height off the floor. End wall 7 is fitted there through, in a sliding manner, with a known heat exchange unit 11 extending beneath lower mold 4, coaxially with axis 6, and moved axially in relation to lower mold 4 between a raised operating position and a lowered idle or rest position by means of one or more lifting devices 12. A detailed description of heat exchanger unit 11 is provided in U.S. Pat. No. 4,747,765, which is incorporated herein by reference in the interest of full disclosure.

Upper half mold 3 comprises a cylindrical wall 13 coaxial with vertical axis 6 and is closed at the top by end wall 14. Cylindrical wall 13 includes a flange 15 extending radially outwardly from the bottom edge of wall 13 and has a number of equally-spaced through slots 16.

Flange 8 includes a number of equally-spaced through holes 17 aligned with respective slots 16 for assembling, onto flange 8, a known clamping device 18 comprising a number of actuators 19 connected integrally with the lower surface of flange 8 at respective holes 17. Each actuator 19 includes an output rod 20 extending through a respective hole 17, parallel to axis 6, and has fitted onto its free end an elongated transverse plate 21. Together with its respective rod 20, each plate 21 slides, parallel to axis 6, through a respective slot 16, and is turned about the major axis of rod 20 by its respective actuator 19, so as to engage the upper surface of flange 15 and grip flanges 15 and 8 in a fluid-tight manner when rod 20 moves down or is retracted.

Appendices 9a, 9b of lower half mold 4 are fitted with respective bushings 22 parallel to axis 6 and are engaged in turn, in a sliding manner, by respective guide rods 23, 24 located between respective appendices 9a, 9b and respective appendices 25. The latter, which are indicated respectively at 25a and 25b, extend radially outwardly from wall 13 of half mold 3 and face respective appendices 9a, 9b.

Rods 23, 24 are fitted at this upper extremity with respective brackets 26, 27 for connecting rods 23, 24 to the fixed outer portion of respective supports 28, 29, the rotary inner portions (not shown) of which are fitted onto respective pines (not shown) integral with respective appendices 25a, 25b and coaxial with each other and with a horizontal axis 30 intersecting vertical axis 6. The pin integral with appendix 25a forms an extension of the output shaft (not shown) of a reversible electric motor 31 supported on bracket 26.

Two linear actuators 32 and 33 are provided for axially displacing upper half mold 3 in relation to lower half mold 4, in the angular position defined by rods 23, 24 and respective bushings 22, and between a lowered operating position (not shown) and the raised idle or rest position shown in FIG. 1. Each actuator 32 and 33 comprises a body 34 connected integral with respective appendices 9a, 9b; and an output rod 35 extending parallel to axis 6 and at least equal in length to the outside radius of flange 15. The top end of rod 35 of actuator 32 is hinged to the lower surface of bracket 26, while the top end of rod 35 of actuator 33 is hinged to a fixed portion of support 29 via the interposition of a bracket 36.

Figure 2:
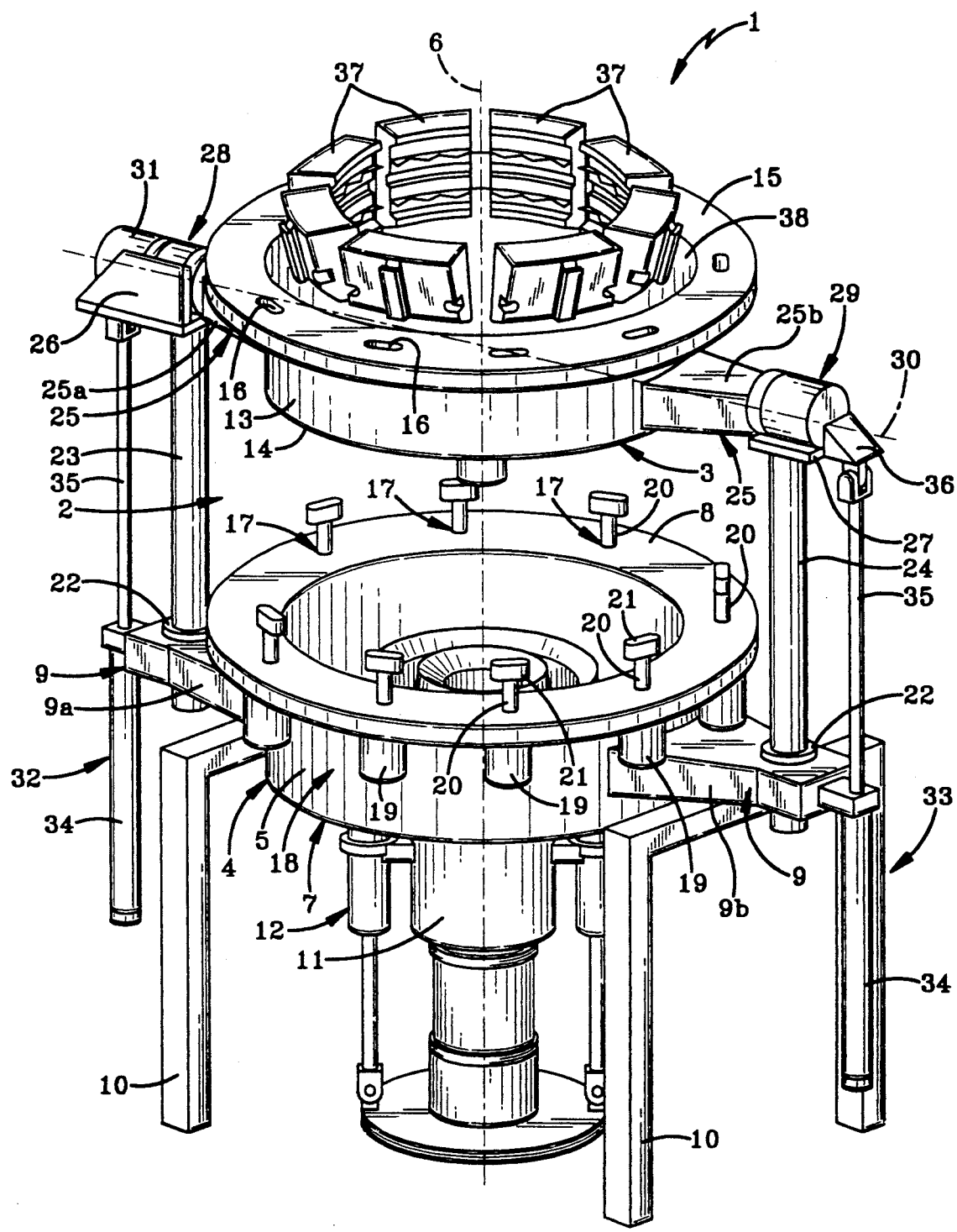
FIG. 2 shows a view, in perspective, of the FIG. 1 unit in a different operating position.

As shown in FIG. 2, upper half mold 3 houses a number of known mold segments 37 connected in a sliding manner to the conical inner surface (not shown) of a known supporting ring 38, the cylindrical outer surface of which is made integral with the inner surface of cylindrical wall 13.

Being well known in the art, no explanation is required herein of the procedure whereby a green tire (not shown) is assembled inside mold 2 with half mold 3 in the raised idle position; mold 2 is closed; the green tire is cured and mold 2 is opened for extracting the cured tire.

On curing unit 1 as described above, however, for maintaining and/or changing mold segments 37, upper half mold 3, when raised by actuators 32 and 33, may be rotated to a maintenance position with its concave side facing upwardly.

The maintenance position of upper half mold 3, as shown in FIG. 2, not only relieves the operator of the necessity for working between half molds 3 and 4, but also enables mold segments 37 to be detached safely from ring 38 with no danger to the operator. In fact, in the maintenance position, upper half mold 3 functions as a container for segments 37.

By virtue of the vertical axis 6 of unit 1 as described above, half mold 3 is switched from the FIG. 1 idle position to the FIG. 2 maintenance position by simply rotating it upside down so that the concave sides of half molds 3 and 4 both face upwardly, and half molds 3 and 4 are again coaxial with each other and axis 6. This is done by activating motor 31, which provides for rotating upper half mold 3 by 180° about axis 30. If, according to a variation not shown, axis 6 is other than vertical, said maintenance position, wherein half mold 3 is arranged with its concave side facing upwards, is achieved by rotating half mold 3 about axis 30 by an angle of other than 180°.

Figure 3:
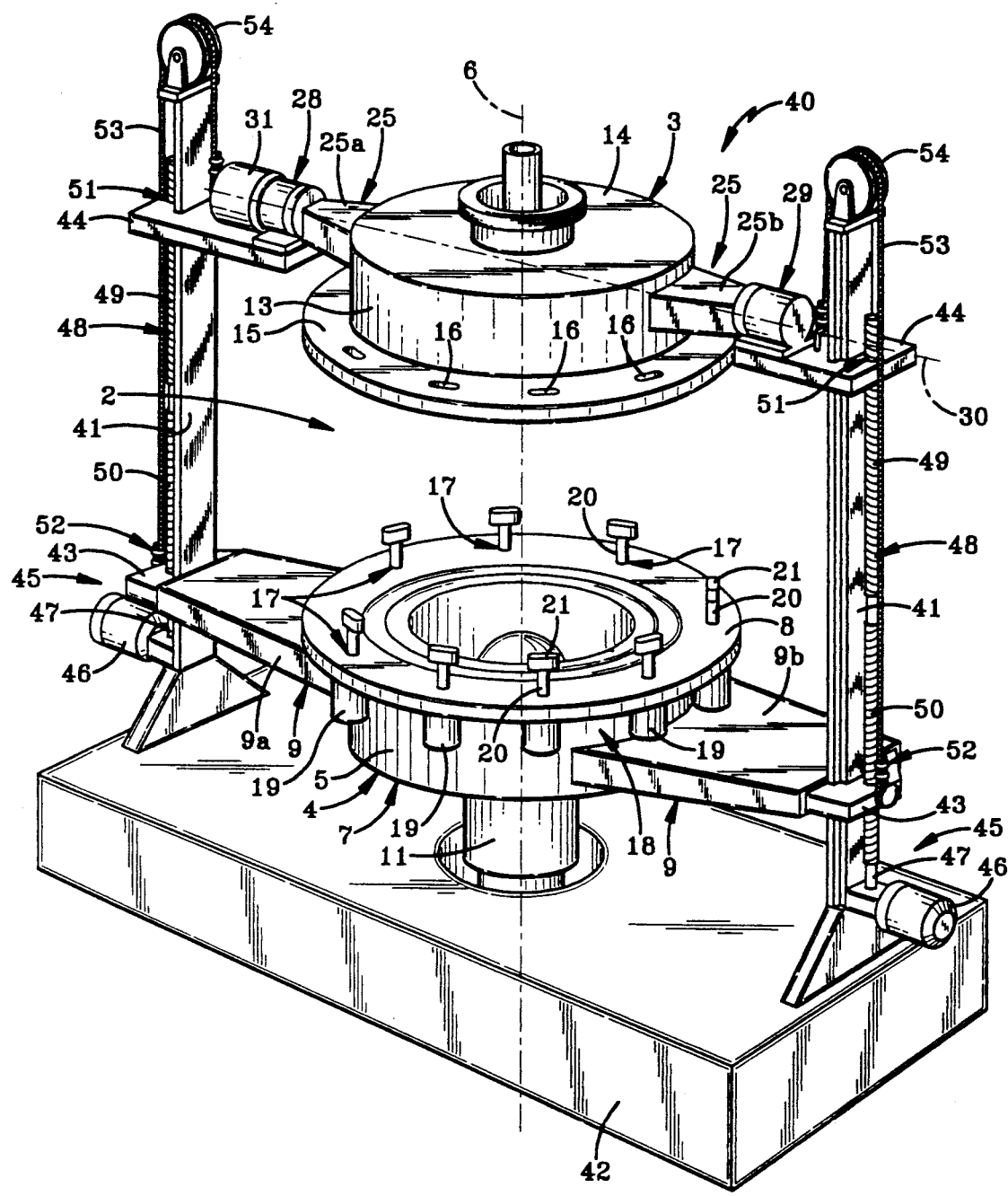
FIG. 3 shows a view, in perspective, of a second embodiment of the curing unit according to the present invention.

The FIG. 3 embodiment relates to a curing unit 40 differing in a number of respects from curing unit 1, in having an upper and a lower half mold 3 and 4 designed to move, coaxially, relative to vertical axis 6, along two vertical pillars 41 mounted on a base 42.

On the free end of each appendix 9, lower half mold 4 is fitted integrally with a slide 43 engaging, in a sliding manner, a respective pillar 41. Similarly, upper half mold 3 includes a slide 44 fitted integrally with the fixed portion of each support 28, 29 and engaging, in a sliding manner, a respective pillar 41. Like bracket 26 on unit 1, slide 44, connected to support 28 also supports motor 31 for rotating upper half mold 3, in relation to pillars 41 and about axis 30, between the idle position shown in FIG. 3 and a maintenance position (not shown) wherein the concave side of half mold 3 faces upwardly.

Half molds 3 and 4 are moved in opposite directions between the operating position (not shown), wherein mold 2 is closed and half molds 3 and 4 are gripped in a fluid-tight manner by clamping device 18, and the FIG. 3 idle position, wherein mold 2 is opened, by means of an actuating device 45 comprising a reversible electric motor 46 on the bottom end of each pillar 41. By means of a coupling 47, each motor 46 provides for rotating a vertical shaft 48 having two oppositely-threaded portions 49 and 50 connected to respective appendices 9 and 25 via respective screw-nut screw couplings 51 and 52.

For each pillar 41, actuating device 45 also comprises a cable 53 wound about a pulley 54 on the upper end of pillar 41, for connecting a respective slide 43 of lower mold 4 to a respective slide 44 of upper mold 3. The design of actuating device 45 enables lower half mold 4 to act as a counterweight for upper half mold 3 during displacement of the same between said operating and idle positions, and also enables half molds 3 and 4 to be displaced using relatively low-power motors 46 required to overcome substantially only the internal friction of unit 40.

From the foregoing description and the operational discussion, when read in light of the several drawings, it is believed that those familiar with the art will readily recognize and appreciate the novel concepts and features of the present invention. Obviously, while the invention has been described in relation to only a limited number of embodiments, numerous variations, changes, substitutions and equivalents will present themselves to persons skilled in the art and may be made without necessarily departing from the scope and principles of this invention. As a result, the embodiments described herein are subject to various modifications, changes and the like without departing from the spirit and scope of the invention with the latter being determined solely by reference to the claims appended hereto.

I claim:

1. A tire curing unit comprising a mold which in turn comprises two oppositely-concave half molds coaxial with each other and with a first axis; a number of mold segments connected in a sliding manner to a first one of said half molds; means for releasably connecting said half molds; and first actuating means for moving said half molds in relation to each other along said first axis and between a closed nd an open position; and second actuating means for rotating at least said first half mold about a second axis substantially perpendicular to said first axis and to and form a maintenance position wherein the concave side of said first half mold faces substantially upwardly.

2. A curing unit as claimed in claim 1, wherein when said first half mold is in said maintenance position, said concave sides of said half molds face substantially in the same direction.

3. A curing units as claimed in claim 1 wherein when said first half mold is in said maintenance position, said half molds are coaxial with each other.

4. A curing mold as claimed in claim 1, wherein said first axis is vertical.

5. A curing unit as claimed in claim 4, wherein said second axis is a horizontal axis intersecting said first axis.

6. A curing unit as claimed in claim 4, wherein said first half mold is an upper half mold, and said other mold half is a lower half mold.

7. A curing unit as claimed in claim 6, wherein said lower half mold is axially fixed; said first actuating means being located between said half molds for axially displacing said upper half mold in relation to said lower half mold between said open and closed positions.

8. A curing unit as claimed in claim 7, wherein said second actuating means is located between said first actuating means and said upper half mold.

9. A curing unit as claimed in claim 6, wherein said curing unit also includes guide means extending parallel to said first axis; and first and second slide means mounted so as to slide along said guide means; both said half molds traveling axially in opposite directions between said open and closed positions; and each one of said half molds being connected to a respective one of said slide means and traveling with same along said guide means.

10. A curing unit as claimed in claim 9, wherein said first actuating means is located between said two slide means; said second actuating means being located between said first half mold and said respective slide means.

11. A curing unit as claimed in claim 9 wherein said first actuating means includes flexible connecting means between said half molds, and transmission means for said flexible connecting means; said transmission means being located on said upper half mold.

12. A curing unit as claimed in claim 11, wherein said transmission means is supported on said guide means.

* * * * *

UNITED STATES PATENT AND TRADEMARK OFFICE
CERTIFICATE OF CORRECTION

PATENT NO. : 5,208,045
DATED : May 4, 1993
INVENTOR(S) : Karl J. Siegenthaler

It is certified that error appears in the above-indentified patent and that said Letters Patent is hereby corrected as shown below:

Col. 4, line 36, change the word "nd" to --and--;

Col. 4, line 39, change the word "form" to --from--.

Signed and Sealed this

Fourth Day of January, 1994

Attest:

BRUCE LEHMAN

*Attesting Officer*      *Commissioner of Patents and Trademarks*